(12) United States Patent
Harris

(10) Patent No.: US 10,853,905 B2
(45) Date of Patent: Dec. 1, 2020

(54) INSTRUCTION EXECUTION IN GRAPHICS PROCESSOR SHADER PROGRAMS

(71) Applicant: Arm Limited, Cambridge (GB)

(72) Inventor: Peter William Harris, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/127,062

(22) Filed: Sep. 10, 2018

(65) Prior Publication Data
US 2020/0082491 A1   Mar. 12, 2020

(51) Int. Cl.
*G06T 15/50* (2011.01)
*G06T 1/20* (2006.01)
*G06T 1/60* (2006.01)
*G06T 15/00* (2011.01)

(52) U.S. Cl.
CPC .................. *G06T 1/20* (2013.01); *G06T 1/60* (2013.01); *G06T 15/005* (2013.01)

(58) Field of Classification Search
CPC ......... G06T 15/005; G06T 1/20; G06T 15/50; G06T 15/80; G06F 9/30145; G06F 9/30181; G09G 5/363
See application file for complete search history.

(56) References Cited

U.S. PATENT DOCUMENTS

| 2003/0067473 | A1* | 4/2003 | Taylor ................... G06T 15/005 345/561 |
| 2017/0024847 | A1* | 1/2017 | Engh-Halstvedt ........ G06T 1/20 |
| 2018/0365017 | A1* | 12/2018 | Shirvani ............... G06F 9/3865 |

* cited by examiner

*Primary Examiner* — Hau H Nguyen
(74) *Attorney, Agent, or Firm* — Vierra Magen Marcus LLP

(57) ABSTRACT

When executing a shader program to perform graphics shading operations in a graphics processor, the graphics processor determines for instructions to be executed for the shader program, whether to replace the instructions with alternative instructions, based on the nature of the instructions and the values of input operands to be processed by the instructions, and either retains an instruction or replaces the instruction with an alternative instruction, accordingly.

24 Claims, 10 Drawing Sheets

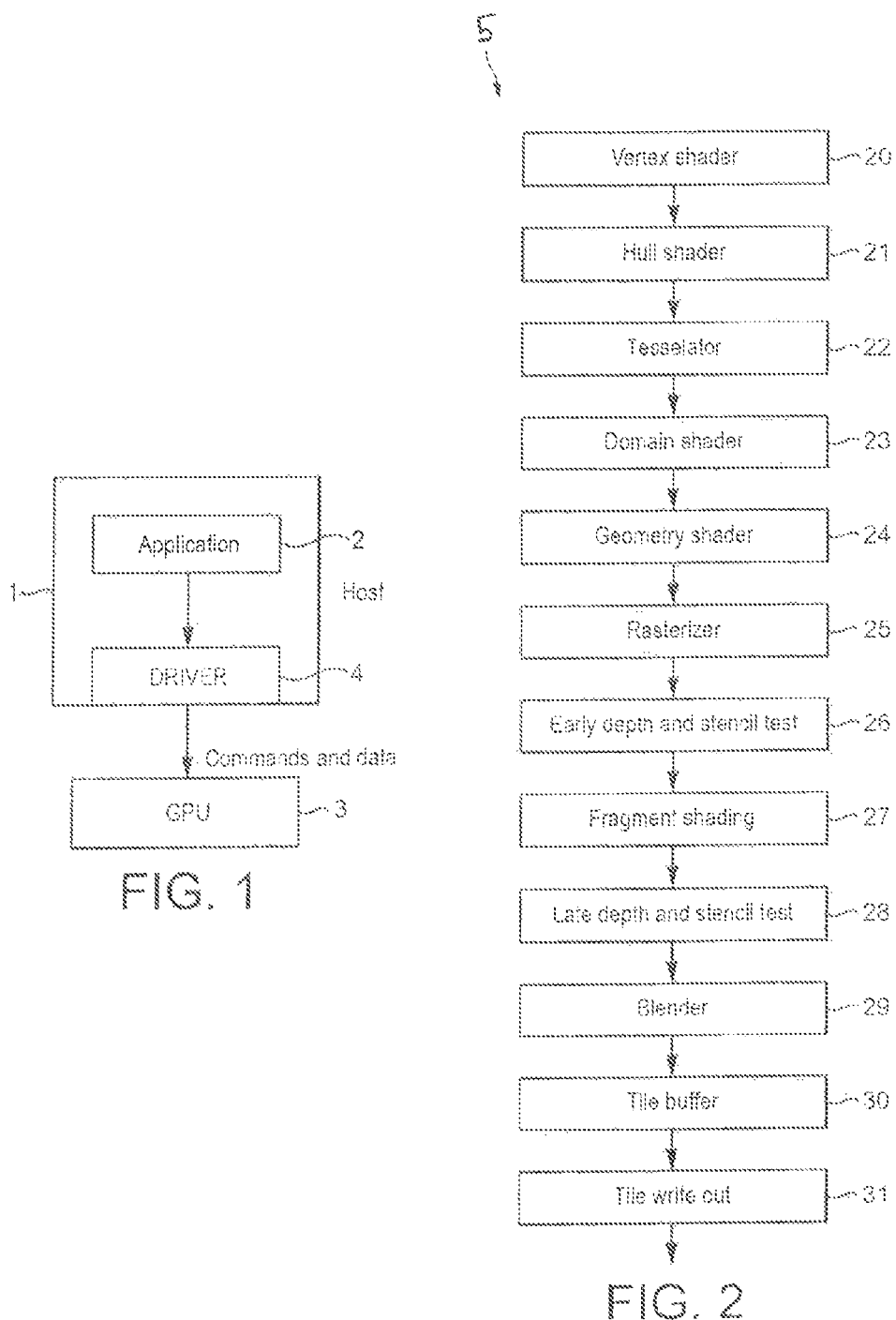

INSTRUCTION EXECUTION IN GRAPHICS PROCESSOR SHADER PROGRAMS

BACKGROUND

The technology described herein relates to graphics processing systems and in particular to the operation of graphics processors (graphics processing units (GPUs)) that execute one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a vertex shader and a fragment (pixel) shader. These shaders are programmable processing stages that execute shader programs on input data values to generate a desired set of output data (e.g. appropriately shaded and rendered fragment data in the case of a fragment shader) for processing by the rest of the graphics processing pipeline and/or for output.

A graphics processor (a graphics processing unit (GPU)) that executes a graphics processing pipeline that includes one or more shaders will accordingly comprise one or more "shader cores" comprising appropriate programmable processing circuitry for executing the shader stages of the graphics processing pipeline. This programmable processing circuitry may comprise appropriate execution units and execution pipelines, such as one or more arithmetic units (arithmetic pipelines), load and store execution units (load and store pipelines), etc. The shaders of the graphics processing pipeline may share programmable processing circuitry and execution units, etc., or they may each be distinct programmable processing units and/or execution units, etc.

A graphics processing pipeline shader performs processing by running small programs for each "work item" in an output to be generated, such as a render target, e.g. frame. A "work item" in this case would usually be a vertex or a fragment (e.g. in the case of a fragment shader). Where the graphics processing pipeline is being used for "compute shading" (e.g. under OpenCL or DirectCompute), the work items will be appropriate compute shading work items. Shader operation generally enables a high degree of parallelism, in that a typical render output, e.g. frame, will feature a large number of work items (e.g. vertices or fragments), each of which is to be subjected to similar processing and can be processed independently.

In graphics shader operation, each work item is processed by means of an execution thread that will execute the shader program in question for the work item in question. The shader program will comprise a sequence of instructions for execution, and each thread will execute instructions in the sequence of instructions to execute the shader program.

The Applicants believe that there remains scope for improvements to the execution of shader programs in graphics processors that execute graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
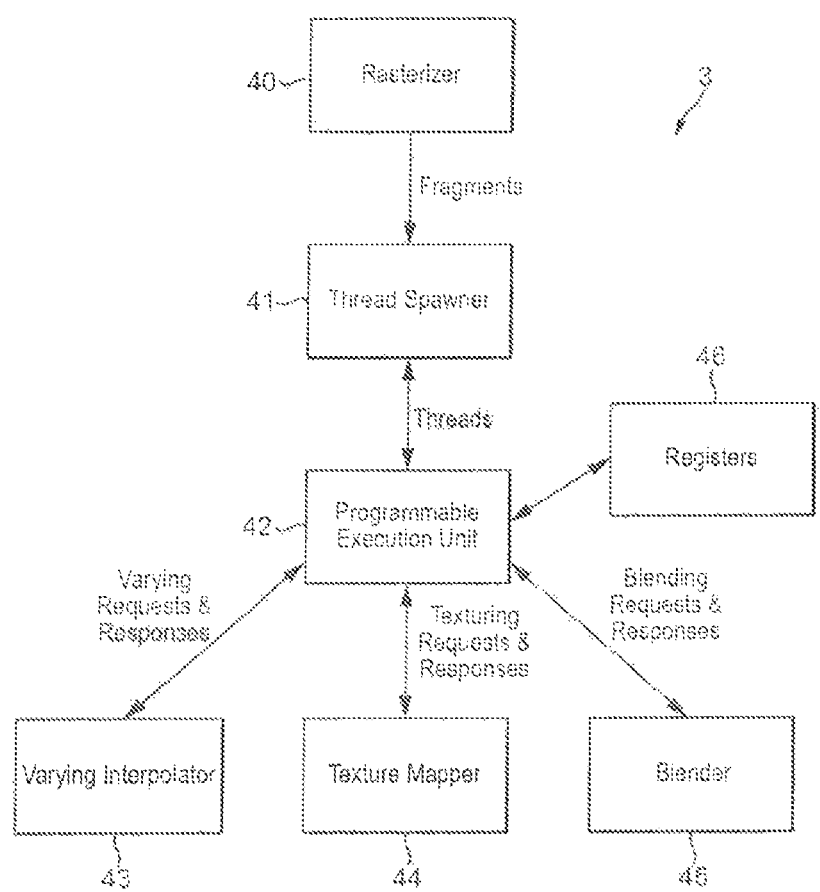
FIG. 3 shows schematically a graphics processing unit.

A first embodiment of the technology described herein comprises a method of operating a graphics processor that executes a graphics processing pipeline which includes a programmable shading stage that executes graphics shader programs to perform graphics shading operations, the method comprising:

the graphics processor, when executing a shader program to perform graphics shading operations:

for an instruction to be executed for the shader program:

determining, based on the nature of the instruction and the value of an input operand to be processed by the instruction, whether to replace the instruction with an alternative instruction; and based on the determination, either:

retaining the instruction and continuing execution of the shader program with the retained instruction;

or replacing the instruction with an alternative instruction and continuing execution of the shader program with the alternative instruction in place of the instruction.

A second embodiment of the technology described herein comprises a graphics processor that executes a graphics processing pipeline which includes a programmable shading stage that executes graphics shader programs to perform graphics shading operations, the graphics processor comprising:

programmable processing circuitry operable to execute graphics shader programs to perform graphics shading operations;

and further comprising:

instruction replacement circuitry operable to, when the programmable processing circuitry is executing a shader program to perform graphics shading operations:

for an instruction to be executed for the shader program:

determine, based on the nature of the instruction and the value of an input operand to be processed by the instruction, whether to replace the instruction with an alternative instruction; and based on the determination, either:

retain the instruction in the shader program and cause the programmable processing circuitry to continue execution of the shader program with the retained instruction;

or replace the instruction with an alternative instruction in the shader program and cause the programmable processing circuitry to continue execution of the shader program with the alternative instruction in place of the instruction.

The technology described herein relates to the execution of shader programs by graphics processors. In the technology described herein, when a shader program is being executed, it is determined whether an instruction in the shader program can be replaced (substituted) with an alternative instruction. This is based on the nature of the (original) instruction in the shader program and the value of at least one input operand for the (original) instruction.

The Applicants have recognised in this regard that shader programs can include instructions that, depending upon the values of the input operands for those instructions, may be able to be performed with alternative (and, e.g., more energy efficient) instructions (operations). For example, if a multiplier operand for a fused multiply-add (FMA) instruction is 0, then the same result can be achieved by performing a move operation (executing a MOV instruction), which should be less energy intensive and may also otherwise improve performance than if performing the fused multiply-add operation with the multiplier operand value of 0. Accordingly, in this case, replacing the fused multiply-add instruction with a move instruction may not only save energy, but also improve performance when executing the shader program.

The technology described herein facilitates this, by identifying, based on the nature of an instruction and the value of an input operand for the instruction, whether the instruction can be replaced (substituted) with an alternative instruction or not. This then facilitates, as will be discussed further below, substituting instructions in shader programs with, e.g., faster and/or less energy intensive, instructions, where the opportunity exists to do so. This can accordingly save energy when executing a shader program, and may also otherwise improve performance when executing the shader program.

Moreover, the Applicants have recognised that it can be relatively common for the input data values for a shader operation to effectively render the shader operation in question redundant. For example, when a shader program is being used to apply effects which are exposed and controlled by the application developer (e.g. game artist), then the Applicants have recognised that it can be relatively common for the, e.g. game artist, to set the input data values to either 0 or 1 so as to effectively disable the effect caused by the shader program (instead of, for example, including a special shader program variant when it is desired to disable the effect caused by the shader program). An example of this would be, in the case of a game, a shader program to apply an, e.g. red, tint to the frames being displayed to show injury to a player. In the case where the red tint is not required (the player is uninjured), then a game artist could simply set the input data values for the tint operation to, e.g. 1, to disable the tint, but the shader program would still be executed using those input data values.

It can also commonly be the case that shader programs where the effects of the shader may be disabled by setting the input data values appropriately can be relatively short, so the shader effects that are disabled by appropriate setting of the data values (but still executed) can add up to a substantial portion of the runtime and/or energy consumption in use.

Accordingly, the technology described herein may facilitate significant energy savings and/or performance improvements, by identifying those situations where shader program operation is effectively being disabled by the setting of the input data values, and in that event, substituting alternative, e.g., and in an embodiment, less energy intensive and/or faster, etc. operations (instructions) for the "disabled" operation (instruction) accordingly.

It should also be noted here that the determination and potential replacement (substitution) of instructions in a shader program with alternative instructions is performed in the technology described herein on and by the graphics processor when executing the shader program. Thus the shader program can be, and is in an embodiment, provided to the graphics processor in its "normal" compiled form, and there is no need to modify the compiler operation, and the compiler operation is in an embodiment not modified, to take account of the operation in the manner of the technology described herein.

It should also be noted that the operation in the manner of the technology described herein is to replace (where it is determined to be possible) an instruction in the shader program with an alternative, substitute instruction. Thus the operation is not simply to conditionally execute instructions in a shader program, rather the operation is to substitute one instruction for another (where it is identified that it is possible to do that). Thus the shader program to be executed after the operation in the manner of the technology described herein will still include an instruction at the position of, and corresponding to, the original instruction that was being considered, it is just that the original instruction may have been replaced with an alternative instruction. This enables the result that would be produced by executing the instruction that is replaced is still produced in response to the replacement instruction, and so accordingly to be available for any dependent computation in the shader program that would use the result of the instruction that has been replaced.

Thus the operation in the manner of the technology described herein does not remove instructions completely from the instruction stream, but is a conditional substitution (replacement) of instructions in the instruction stream (rather than a conditional execution of instructions in the instruction stream).

The shader program for which the operation in the manner of the technology described herein is performed can be any suitable and desired shader program to be executed by a programmable shading stage of a graphics processing pipeline. Thus it may comprise, for example, a vertex shading program, a fragment shading program, or a compute shading program, as desired. It is believed that the technology described herein may be particularly applicable to fragment shader operation, and so in one embodiment, the shader program is a fragment shading program (a program to perform graphics fragment shading operations).

Correspondingly, the programmable shading stage of the graphics processing pipeline may equally comprise any suitable and desired shading stage ("shader") of a graphics processing pipeline and that a graphics processing pipeline can include or act as, such as a vertex shader or fragment shader or a compute shader. Again, in one embodiment, the programmable shading stage is a fragment shader.

The programmable shading stage will be, and is in an embodiment, implemented as (and the shader program is executed by) appropriate programmable processing circuitry of the graphics processor. There is in an embodiment a programmable execution unit ("shader core") that is operable to execute shader programs to perform processing operations. Thus the programmable execution unit will receive execution threads to be executed, and execute appropriate shading programs for those threads to generate the desired output.

The programmable processing circuitry (execution unit(s)) may operate solely as one type of shader, but the programmable processing circuitry (execution unit(s)) may typically be able to (and in an embodiment can) run plural different types of shader, i.e. such that the programmable processing circuitry (execution unit(s)) may be appropriately programmed, e.g. at different times, to function as one type of shader (e.g. as a fragment shader (to perform fragment shading operations)), and to function as other forms (types) of shader.

There may be a single or plural programmable execution units. Where there are plural programmable execution units, each execution unit can in an embodiment operate in the manner of the technology described herein. The programmable execution unit (and each programmable execution unit) may comprise any suitable programmable hardware element such as programmable processing circuitry. Each programmable execution unit may be provided as a separate circuit element to other programmable execution units of the graphics processor or the programmable execution units may share some or all of their programmable processing circuitry.

The operation in the manner of the technology described herein to potentially replace instructions in a shader program could be performed for all shader programs to be executed by the graphics processor, or could be performed for only particular, in an embodiment selected, in an embodiment predetermined, shader programs. For example, the operation could be enabled for all "graphics" shader programs, but not performed for "compute" shader programs (such as OpenCL compute shader programs), if desired. This may be based, for example, upon whether the replacement instruction(s) would be able to return the desired result value if executed in place of the instruction that they are replacing. (For example, in some cases, the shader program API may mandate that an operation returns a particular result, such as "not a number" (NaN), e.g. in certain circumstances, and if the replacement instruction would not do that, then the replacement should not be made.)

Thus, in an embodiment, the operation in the manner of the technology described herein can be enabled (and/or disabled) globally for particular types of shader program.

Correspondingly, the operation in the manner of the technology described herein could be performed for all instructions included in a shader program (e.g. where enabled for that type of shader program), or could be enabled only for particular, in an embodiment selected, in an embodiment predetermined, instructions and/or types of instructions in a shader program.

For example, the operation could be enabled globally for all the instructions in a shader program (and in one embodiment this is the case). This may be indicated by, for example, setting an appropriate state parameter, such as a (single) "enable" bit, to indicate that the substitution operation in the manner of the technology described herein has been globally enabled (or not).

Additionally or alternatively, an indication could be given in respect of individual instructions or sets of instructions to indicate that the substitution operation should be considered for those instructions. This may again be indicated by associating appropriate state information, such as flags, with the instructions or sets of instructions, and would allow more fine grained control of the operation, albeit at the expense of maintaining and tracking additional state information (for example).

Other arrangements would, of course, be possible.

The determination of whether to replace an instruction with an alternative instruction is based on the nature of the instruction and the value of an input operand for the instruction.

In an embodiment, this determination is carried out as a two-part process, in which it is first determined based on the nature of the instruction whether the instruction is an instruction for which a replacement (substitution) is available (whether the instruction is a candidate for potential replacement), followed by a determination based on the value of an input operand for the instruction, whether the replacement with the alternative instruction should be performed or not.

Other arrangements would, of course, be possible.

The determination based on the nature of the instruction can be performed in any suitable and desired manner.

In an embodiment, the type of the instruction (and/or the type of operation the instruction performs) is considered for this purpose.

The types of instructions (and operations) for which the "replacement" operation in the manner of the technology described herein is (potentially) performed (i.e. that will trigger a (potential) replacement operation) can be any suitable and desired types of instructions (operations) that could be replaced with alternative instructions (operations) in dependence upon the value of an input operand for the instruction. As discussed above, the technology described herein is particularly intended to be used for, and applicable to, instructions for which particular input data values may effectively "disable" or simplify the operation that the instruction is performing.

In an embodiment, there is a particular, in an embodiment selected, in an embodiment predetermined, set of one or more instruction types (and/or operations) that may be, and in an embodiment will be, considered for replacement in the manner of the technology described herein. Thus, if it is determined that an instruction in the shader program comprises one of the instruction types (operations) in the set of instruction types (operations), then it will be determined that the instruction can (potentially) be replaced with an alternative instruction.

There may be only a single instruction type (operation) that is considered for potential replacement in the manner of the technology described herein, but in an embodiment there is a set of plural different instruction types (operations) that are indicated as being suitable for, and considered for, potential replacement in the operation of the technology described herein.

Thus in an embodiment, it is determined whether the instruction in the shader program comprises an instruction of a particular, in an embodiment selected, and in an embodiment predetermined, type (e.g. of a set of one or more particular, in an embodiment selected, in an embodiment predetermined, instruction types), and when it is determined that the instruction in the shader program does not comprise the, or one of the, particular instruction type(s), then the instruction is not replaced with an alternative instruction (but if it is determined that the instruction in the shader program comprises the, or one of the, particular instruction type(s), it is then considered whether to replace the instruction with an alternative instruction based on the value of an input operand for the instruction).

Correspondingly, in an embodiment, it is determined whether the instruction in the shader program comprises an instruction that is to (that will) perform an operation of a particular, in an embodiment selected, and in an embodiment predetermined, type (e.g. of a set of one or more particular, in an embodiment selected, in an embodiment predetermined, operations), and when it is determined that the instruction in the shader program does not perform the, or one of the, particular operation type(s), then the instruction is not replaced with an alternative instruction (but if it is determined that the instruction in the shader program performs the, or one of the, particular operation type(s), it is then considered whether to replace the instruction with an alternative instruction based on the value of an input operand for the instruction).

In one embodiment, the instruction types (and/or operations) that are considered for potential replacement in the operation of the technology described herein comprise one or more of, and in an embodiment all of: a multiplication instruction (operation), a fused multiply-add instruction (operation), an addition instruction (operation), a subtraction instruction (operation), and a reciprocal instruction (operation).

In one embodiment, only the instruction "type" (the operation that the instruction is to perform) is considered for triggering a potential replacement with an alternative instruction.

In another embodiment, the "replacement" determination is also or instead (and in an embodiment also) based on other parameters of the instruction, such as, and in an embodiment, the number and/or nature (e.g. type) of the input operands for the instruction.

For example, and as will be discussed further below, in an embodiment, it is also or instead (and in an embodiment also) considered whether the instruction has an input operand (or operands) of a particular, in an embodiment selected, in an embodiment predetermined, type, and/or how many of those input operands it has (e.g. whether it has a single one of those input operands, or plural of those input operands (with, e.g., and in an embodiment, the instruction only being considered for potential replacement if it has a single input operand of the particular type (but not plural operands of the particular type or no operands of the particular type))).

Other arrangements would, of course, be possible.

(Any instructions that are not of the particular "nature" that can potentially be replaced in accordance with the technology described herein, should be, and are in an embodiment, simply left in the shader program and subsequently executed in the normal manner for the graphics processor and shader operation in question.)

As well as considering the nature of the instruction, the decision as to whether to replace the instruction with an alternative instruction is also based on the value of an input operand for the instruction. The determination could be based on the values of plural input operands for the instruction, if desired, but in an embodiment is based on the value of a single input operand only. In an embodiment, it is determined whether the input operand in question has a particular, in an embodiment selected, in an embodiment predetermined value, with the instruction then being replaced if the input operand has that particular data value, but not otherwise.

It would be possible in this regard to determine whether the input operand in question has one of a set of particular, in an embodiment selected, in an embodiment predetermined values (with the instruction then being replaced if the input operand has one of the set of particular data values but not otherwise), but in an embodiment, it is considered whether the input operand has a single particular, in an embodiment selected, in an embodiment predetermined, data value only. In this case, the particular data value that triggers the instruction statement is in an embodiment 0 or 1, and in an embodiment it is one of those values. Thus, e.g., and in an embodiment, depending upon the type of instruction, it will be determined whether the input operand has the value 1 or it will be determined whether the input operand has the value 0.

Thus in an embodiment, it is determined whether the data value of an input operand for the instruction in the shader program has a particular, in an embodiment selected, and in an embodiment predetermined, value (or one of a set of plural particular, in an embodiment selected, in an embodiment predetermined values), and when it is determined that the input operand does not have the particular value, then the instruction is not replaced with an alternative instruction (but when it is determined that the input operand has the particular value, the instruction is then replaced with an alternative instruction).

It would in this regard be possible to consider the value of any (appropriate) input operand for the instruction.

However, in an embodiment, the input operand whose value is considered to determine whether to replace the instruction or not is an input operand that is a constant variable for the shader program in question (i.e. whose value is not set by (and that cannot be set by) operations of the shader program itself (but that is, e.g., and in an embodiment, set (defined) in advance for the shader program execution in question, e.g., and in an embodiment, as part of the initial data (and state) for the shader program execution in question) (i.e. that acts as a constant).

An example of such an input operand would be a so-called "uniform" in OpenGL shading language (GLSL), i.e. a pre-defined input value that is constant for, and unmodifiable by, all threads in a single set of program invocations (where a set is one draw call, or one compute dispatch).

Thus, the input operand whose value is considered is in an embodiment an operand whose value will not change from one execution of a shader program to the next within a particular overall graphics processing task, such as, and in an embodiment, within a particular graphics draw call or compute dispatch, and/or in an embodiment an operand that is read only as far as the shader program is concerned, and/or is in an embodiment an operand whose value will be set by the application (by the application programmer) when indicating the shader program and requesting the execution of the shader program by graphics processor.

Thus, the input operand whose data value is considered is in an embodiment an input operand for which the data value will be the same for all the threads that are executing the shader program (at least for the current processing task) (i.e. such that each thread will receive the same data value for the input operand, which it can read, but cannot change).

The Applicants have recognised in this regard that because such "uniform" variables when used as input operands will be the same for each execution of an instruction that uses that variable as an input operand in a shader program (and for each execution of the shader program itself that is using that set value of the input operand), the determination of the value of that "uniform" input operand (and in particular whether it has the particular data value to trigger the instruction substitution or not) can be performed more efficiently, than, for example, for input operands whose values may vary each time (e.g. because they are determined whilst executing the shader program itself) (which may require, for example, additional register file accesses to determine the data values, and/or potentially more complex tracking and determination of the input operand value during execution of the shader program).

Also, the value of input operands that are "uniform" variables can be guaranteed to be true for all the threads in a group of threads that are executing the shader program, such that, for example, the determination of whether the "uniform" variable input operand has the particular data value to trigger instruction replacement or not can be done less often than once per use and applied to all the threads in a group of threads that are to execute the program using that value, thereby amortising that determination across multiple threads (unlike in the case where the input operand value may vary from thread to thread (and so may need to be determined and tested "on the fly" for each thread individually)).

Thus, in an embodiment, the input operand whose value is considered when determining whether to replace an instruction with an alternative instruction is an input operand that corresponds to a "uniform" variable, i.e. is an operand that is a "uniform".

Correspondingly, in an embodiment, the instructions to which the operation in the manner of the technology described herein is applied in an embodiment comprise instructions which have an input operand that is a "uniform", and in an embodiment only a single "uniform" input operand (and so instructions which have no input operands that are uniforms, or take more than one input operand that are uniforms are not treated in the manner of the technology described herein, but are simply executed in the normal manner).

The determination of whether to replace the instruction based on the value of the input operand could comprise determining and considering the actual value of the input operand at the time that the instruction replacement determination is being made. However, in an embodiment, the determination of whether to replace the instruction based on the input operand value is done using state information that indicates whether the input operand value has the particular value to trigger the instruction replacement or not.

Thus, in an embodiment, the input operand that is being considered has associated with it a set of state information, such as a flag (bit), that can be set to indicate whether the input operand has the particular data value to trigger the instruction replacement or not.

Thus, in an embodiment, the operation in the manner of the technology described herein will determine whether to execute an instruction or to substitute the instruction with an alternative instruction based on the nature of the instruction, and state information indicative of the value of an input operand for the instruction.

This may be particularly applicable in the case where the input operand is a "uniform" variable, as discussed above, as in that case, it can be, and is in an embodiment, determined when initially setting and/or loading the uniform input variable whether it has the particular data value or not, and the state information for that input variable then set accordingly.

Thus, in an embodiment, a set of state information is maintained for one or more of the input operands for the shader program. This state information in an embodiment indicates whether the value of the input operand is the particular value to trigger instruction replacement or not. Thus in an embodiment, state information is maintained to indicate, for example, whether the input operand value is 1 and/or whether the input operand value is 0.

This may then allow the determination of whether an input operand data value has the particular value to trigger the instruction replacement to be performed in a more efficient manner. For example, by making the "replacement" decision based on a "pre-processed" version of the operand (i.e. the state information), the use of (expensive) per-use comparators can be avoided.

In one embodiment, this state information is determined and set when setting the input operand values for use by the shader program.

For example, when the input operand values are set, defined and/or being generated, appropriate state data for some or all of the input operands (e.g. for the input operands that are "uniform") could also be generated, if desired, and then provided as appropriate state table information, e.g., as metadata, for the input operand values. This could be done, e.g., on a host processor, e.g. as part of the driver operation for the graphics processor.

Additionally or alternatively, the state information could be determined and set when loading the input operand values for use by the shader program (and in an embodiment, this is the case). For example, the graphics processor could itself be operable to analyse the input operand values when it receives them, e.g., and in an embodiment, as it loads those values, e.g. into the register file (registers).

In this case, there could, e.g., be a register file (set of registers) set aside for the loading of uniform variables that are to be used as input operands, and the data values for those uniform input variables could be checked as they are being loaded into the uniforms register file, with their state information then being set accordingly.

Thus, in an embodiment, the process of loading the value of an input operand for use when executing the shader program (e.g., and in an embodiment, when loading the input operand value into a register(s) from which it will be read when executing the shader program) is used to determine and store data value state information for the input operand. This is in an embodiment done for plural, and in an embodiment for all, uniform variables that are to be used as input operands by the shader program in question.

Correspondingly, in an embodiment, the graphics processor operates to (and comprises processing circuitry operable to), when executing a shader program, load input operand values for use when executing the shader program, and when loading the values for the input operands, determines, for one or more of the input operands whose values are being loaded, whether the value of the input operand has a particular, in an embodiment selected, in an embodiment predetermined value (such as 0 or 1), and sets state information indicative of whether the value of the input operand has the particular value or not, accordingly (with the graphics processor then using that state information when considering whether to replace an instruction with an alternative instruction or not to determine whether the input operand value for the instruction has the particular data value that triggers replacement or not).

The graphics processor could also or instead, e.g., execute an initial processing pass over the input operand values to generate the state data, if desired, before executing the shader program proper.

Other arrangements would, of course, be possible.

The alternative instruction that the instruction in the shader program is replaced with when it is determined based on the nature of the instruction and the value of an input operand that the instruction in the shader program should be replaced with an alternative instruction can be any suitable and desired alternative instruction.

The alternative instruction should be, and is in an embodiment, operable to produce the same result as if executing the original instruction with the input operand value in question, but in an alternative, and in an embodiment less energy intensive and/or more efficient, manner. Thus the alternative instruction that is used is in an embodiment based on the nature (e.g. the instruction type and/or operation) of the instruction that it is replacing, and in an embodiment has the effect of performing on its input operand(s) the mathematical operation that would be performed by the instruction that it is replacing (when an input operand to that instruction has the particular data value).

In an embodiment, the alternative instruction is an instruction that performs a "move" operation (a MOV instruction), that will move a data value to (place a data value in) an output variable (output register) for the (original) instruction that is being replaced.

Thus the alternative instruction that the instruction in the shader program is replaced with in an embodiment has as its output or outputs, the, or at least one of the, output variable(s) of the instruction that it is replacing.

The data value that is "moved" to the output variable could be a particular, in an embodiment selected, in an embodiment predetermined, data value (and in one embodiment this is the case), such as (and in an embodiment) 0 or 1. It could also or instead be a data value of one of the input operands of the instruction that is being replaced.

Thus, in an embodiment, the alternative instruction that the instruction in the shader program is replaced with takes as its input or inputs at least one of the input operands of the instruction that it is replacing.

In an embodiment, the alternative instruction is an instruction that performs a "move" operation (a MOV instruction) that will move (copy) a data value from one variable to another, and in an embodiment that will move (copy) a (or more than one) input operand value for the (original) instruction that is being replaced to an (respective) output variable for the (original) instruction that is being replaced.

The Applicants have recognised in this regard, that in the case of multiplication, fused multiply-add, addition and subtraction operations at least, depending upon the input data values that are being multiplied, added or subtracted, etc., it can be the case that the same result can be achieved simply by placing a particular value, such as 0 or 1, in the output of the instruction, and/or by copying one of the input data values to the output of the instruction, and that, accordingly, a move operation (instruction) can be used to do that instead and in a more energy efficient manner.

The replacement, alternative, instruction could also be operable to perform the required operation using a different execution pipeline to the execution pipeline that the original instruction would use (e.g. where the processing circuitry of the shader core that is executing the shader program has plural different execution pipelines). This may then facilitate improved performance, by, for example, allowing alternative execution pipelines to be used for operations in a shader program when it is possible to do that. This could then allow, for example, less energy intensive execution pipelines to be used, and/or for alternative distributions of processing tasks to the execution pipelines to be facilitated.

In an embodiment, the technology described herein is operable to replace a multiplication instruction (operation) with an instruction (operation) that moves 0 to the output in the case where an input operand to the multiplication instruction has a value of 0, and with an instruction that moves the (value of the) other input operand of the multiplication instruction to the output where an input operand to the multiplication instruction has a value of 1 (and otherwise retains (and executes) the original multiplication instruction in the event that an input operand (or the input operand being considered) does not have the value 0 or 1).

In an embodiment, the technology described herein is operable to replace a fused multiply-add (FMA) instruction (operation) with an instruction (operation) that copies (moves) the (value of the) input operand that is not being multiplied to the output in the case that a (or one of the) input operands for the multiplication part of the FMA instruction has a value of 0.

In an embodiment, the technology described herein is operable to replace an addition instruction (operation) with an instruction (operation) that copies (moves) the (value of the) other input operand for the addition instruction to the output in the case that an input operand for the addition instruction has a value of 0.

In an embodiment, the technology described herein is operable to replace a subtraction instruction (operation) with an instruction (operation) that copies (moves) the (value of the) input operand being subtracted from for the subtraction instruction to the output in the case that the input operand being subtracted for the subtraction instruction has a value of 0.

In an embodiment, the technology described herein is operable to replace a subtraction instruction (operation) with an instruction (operation) that copies (moves) the negative of the (value of the) input operand being subtracted for the subtraction instruction to the output in the case that the input operand being subtracted from for the subtraction instruction has a value of 0.

In an embodiment, the determination and instruction replacement is based on a predetermined set of instruction replacement operations that determine based on the input operand value, whether to replace an instruction or to retain the original instruction. Each instruction type that can potentially be replaced is in an embodiment then associated with one of (and in an embodiment with only one of) the instruction replacement operations, with the process then operating such that when a particular instruction type is identified, the particular replacement operation associated with that instruction type is then identified and assessed using the input operand value for the instruction, to then either replace the instruction or retain the original instruction accordingly.

Thus, each instruction type that may be subjected to operation in the manner of the technology described herein in an embodiment has associated with it a corresponding replacement decision operation that will be used in combination with the input operand value(s) for the instruction to determine whether to replace the instruction with an alternative instruction or not. The operation in an embodiment also indicates which alternative instruction to use, should replacement of the instruction be triggered.

In an embodiment, there is a set of at least one (and in an embodiment plural) predetermined instruction replacement operations, with respective instruction types being associated with one of the respective operations in the set, such that when the instruction type is identified, the corresponding operation for determining whether to replace the instruction with an alternative instruction based on the value of an input operand can be determined.

In an embodiment, the instruction replacement operations that can be used are as follows:

00 UNCONDITIONAL (simply execute the original instruction—no replacement is considered)

01 If U==0.0 then MOV 0.0 Elif U==1.0 then MOV src Else EXEC

10 If U==0.0 then MOV src Else EXEC

11 If U==0.0 then MOV-src Else EXEC where:

00 01 10 and 11 identify the operation;

"U" means the, e.g., and in an embodiment, uniform, input operand whose data value is being considered;

"src" means the other, e.g. non-uniform, input operand;

"EXEC" means retain the instruction as normal (do not replace it); and

MOV means replace the instruction with a MOV instruction that copies the indicated data value or input operand to the output.

In an embodiment, the following instruction types use the above instruction replacement operations as follows:

MUL (multiplication) instructions support optimization type 01

FMA (fused-multiply-add) instructions support optimization type 10 (MOV copies accumulator src) (in this replacement, the uniform input operand must be one of the multiplier operands)

ADD (addition) instructions support optimization type 10 (MOV copies src)

SUB (subtraction) src-U instructions support optimization type 10 (MOV copies src)

SUB (subtraction) U-src instructions support optimization type 11 (MOV copies-src)

The determination of whether to replace an instruction with an alternative instruction could be performed for each thread that is executing in the shader program individually (and in one embodiment that is what is done). However, in the case where the execution threads executing the shader program are organised into thread groups (warps) when executing the shader program, then in an embodiment, an instruction in the shader program is only replaced with an alternative instruction in the manner of the technology described herein for a thread group (warp) if that can be done for all the threads in the thread group (warp).

(Shader program execution efficiency may be improved by grouping execution threads (where each thread corresponds, e.g., to one vertex or one sampling position) into "groups" or "bundles" of threads, where the threads of one group are run in lockstep, one instruction at a time. In this way, it is possible to share instruction fetch and scheduling resources between all the threads in the group. Other terms used for such thread groups include "warps" and "wavefronts". For convenience, the term "thread group" will be used herein, but this is intended to encompass all equivalent terms and arrangements, unless otherwise indicated.)

Thus, in an embodiment, where the execution threads executing the shader program are organised into thread groups (warps) when executing the shader program, an instruction in the shader program is only replaced with an alternative instruction in the manner of the technology described herein, if the value of the input operand is the required value for all active threads in the thread group (warp).

The determination of whether to replace an instruction with an alternative instruction and the replacement of an instruction with an alternative instruction can take place at any suitable and desired stage of the process of executing the shader program on the graphics processor. In an embodiment, it is done as part of the instruction issue operation (as part of the instruction issue logic), and in an embodiment as part of (during) the operation for preparing the instructions for issue to the execution lanes for processing (execution).

Thus, in an embodiment, the graphics processor performs one or more instruction "preparation" stages (operations) that are performed prior to issuing instructions for execution, and the determination of whether to replace an instruction with an alternative instruction and the replacement of an instruction with an alternative instruction (if appropriate) is done as part of (and during) this instruction preparation.

These preparation stages may, and in an embodiment do, comprise one or more, or all of, and in an embodiment all of: loading the instructions into an instruction cache; fetching the instructions from the instruction cache; decoding the instructions; fetching the (data for the) operands for the instructions from, e.g., and in an embodiment, appropriate registers (the register file) (before then issuing the instructions for execution). In an embodiment, the instructions are first placed in an instruction issue queue from where they are then issued to the instruction execution circuitry for execution.

Thus the instruction replacement is in an embodiment determined and performed at the instruction preparation/issue stage in the execution pipeline of the graphics processor, and the instruction preparation/issue stage in the execution pipeline correspondingly in an embodiment includes processing circuitry (logic) configured to identify instructions for which a substitution (replacement) can be made and to, based on the input operand value(s), either make the instruction replacement (substitution) or not.

The determination and instruction replacement in the manner of the technology described herein can be performed in any suitable and desired stage of the instruction preparation (prior to issuing the instructions for execution).

In one embodiment the determination is performed after the instructions have been fetched from the instruction cache, and in an embodiment after an instruction has been decoded (after instruction decode). Thus, in an embodiment, the graphics processor, when executing a shader program will, for an (and each) instruction in a shader program to be executed, fetch the instruction from an instruction cache, decode the instruction, and then determine whether the instruction can be replaced or not in the manner of the technology described herein (if appropriate), in an embodiment before fetching the operands for the instruction.

Thus, in one embodiment, the determination and the instruction substitution (if performed) is performed after the instructions are decoded, and, in an embodiment, prior to the fetching of the operands for the instruction.

In another embodiment, the instruction replacement determination and operation is performed when (and as) instructions are being loaded into an (the) instruction cache (i.e. before the instructions are fetched from the cache and then decoded for execution). In this case therefore, in an embodiment the loading of the instructions into the instruction cache includes a stage (operation) of determining whether the instruction that is to be loaded into the instruction cache can be replaced in the manner of the technology described herein.

This approach would have the advantage that the alternative instruction will be present in the instruction cache, such that the replacement (substitution) of the instruction in the shader program should only need to be done once, rather than multiple times (which would be the case where the replacement is made after the instruction has been fetched from the instruction cache and decoded, as in that case each time the instruction is fetched from the instruction cache, the replacement will need to be performed). This arrangement may therefore have lower power consumption than an approach in which the replacement is determined and made after instruction decode, for example. (Although on the other hand, it may be necessary to duplicate cache lines containing substitutions, e.g. per draw call, as the uniform state will be unique to each draw call, which can then reduce cache efficiency.)

In the case where it is determined not to replace the instruction with an alternative instruction, then the (original) instruction will be retained in the shader program, and so the shader program will be executed with the retained instruction. Thus, the retained instruction should be, and is in an embodiment, issued to the execution circuitry of the graphics processor for execution.

On the other hand, when it is determined to replace the instruction with an alternative instruction, then the shader program execution will be continued with the alternative instruction in place of the original instruction. Thus in this case, the alternative instruction should be issued for execution (and the original instruction will not be issued for execution).

The original or alternative instruction, as appropriate, can then be executed in the normal manner as part of the shader program execution. This could, and in an embodiment, does comprise simply executing the instruction, for example, using an appropriate execution processing circuitry and execution pipelines of the graphics processor.

However, in the case where the execution processing circuitry (pipeline or pipelines) of the graphics processor includes the facility to perform operations that would be performed by instructions without the need to execute the instructions on an execution pipeline, then if the alternative (substitute) instruction is for an operation is able to be performed in this manner, then in an embodiment, the replacement instruction's operation is performed in this manner (i.e. such that the alternative instruction will not in fact be executed using an execution processing pipeline, but rather its operation will be performed in the more optimised manner that the graphics processor supports).

In an embodiment, the graphics processor includes an "operand" buffer which acts as a storage for operands for instructions that is in addition to the register files, and from which operands may be fetched without needing main register file access (such that the buffer will serve as a faster access and low power storage for operands compared to the main register files). In this case, a move operation could be implemented by moving data values within that operand buffer (if and when the required data value(s) are present in the operand buffer), which would then avoid the need to execute a "move" instruction on an execution pipeline. In an embodiment, this operation is used for any "move" instructions that are substituted for other instructions in the manner of the technology described herein.

This will then further facilitate the execution and energy efficiency provided by the technology described herein, as it can then mean that any instructions which can be identified as being suitable to be replaced with move instructions in the manner of the technology described herein, can then (potentially) be performed without needing execution of any instructions in the main execution pipelines, and without consuming capacity in the main execution pipelines. (In an embodiment such operation can also be and is also used for any "move" instruction that is included in a shader program in the normal manner, not just for move instructions that are substituted into a shader program as a consequence of the operation in the manner of the technology described herein.)

In this case, the move operation using the operand buffer is in an embodiment performed before issuing the move instruction to the instruction execution pipeline, and, in an embodiment, before the move instruction is added to any instruction issue queue.

Thus there is in an embodiment an "operand" buffer that avoids main register file access for operand values, and in this case, when the required operand value(s) are present in the operand buffer, a "move" instruction is implemented by moving the operand values within the operand buffer, rather than needing execution on one of the main processing pipelines. This can therefore effectively make such move operations "free" from the point of view of thread throughput.

The shader program that is being executed by the graphics processor should be, and is in an embodiment, generated by the compiler (the shader compiler) for the graphics processor and shader in question. As discussed above, the operation in the manner of the technology described herein is performed entirely on the graphics processor when executing the shader program, so the compiler can simply operate in the normal manner to generate the compiled shader program code from the (high level) shader program that is provided, e.g. by the application on the host processor that requires the processing by the graphics processor, without the compiler needing to have any knowledge of, or to take any account of, the operation that may be performed in the manner of the technology described herein by the graphics processor when executing the shader program.

The compiler may, e.g., and in an embodiment does, run on the host processor of the overall data processing system that includes the graphics processor (i.e. such that the graphics processing pipeline is then executed in another, graphics, processor, that is associated with the host processor). In this case, the compiler and compiled code would run on separate processors within the overall data processing system. However, other arrangements would be possible, such as the compiler running on the same processor as the compiled code, or the compiler being run on a (completely) separate processor, such as the program being pre-compiled on a separate system and being distributed in a compiled form.

The compiler in an embodiment is part of and executes on the central processing unit (CPU), such as a host processor, of the graphics processing system, and in an embodiment is part of a driver for the graphics processor that is executing on the CPU (e.g. host processor).

The graphics processor and graphics processing pipeline of the technology described herein will be and is in an embodiment part of an overall graphics processing system that will include, e.g., and in an embodiment, a host processor that, e.g., executes applications that require graphics processing by the graphics processor. The host processor will send appropriate commands and data to the graphics processor to control it to perform graphics processing operations and to produce graphics processing (render) output required by applications executing on the host processor. To facilitate this, the host processor should, and in an embodiment does, also execute a driver for the graphics processor and a compiler or compilers for compiling shader programs to be executed by the programmable shading stage(s) executed by the graphics processor.

The graphics processor may also comprise, and/or be in communication with, one or more memories and/or memory devices that store the data described herein, and/or the output data generated by the graphics processor, and/or store software for performing the processes described herein. The graphics processor may also be in communication with a host microprocessor, and/or with a display for displaying images based on the data generated by the graphics processor.

As well as any programmable processing (shader) stages, the graphics processor and graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (circuitry/circuits) and/or programmable hardware elements (circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and processor can otherwise include any one or more or all of the usual functional units, etc., that graphics processing systems and processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 5 that is executed by the graphics processor 3 in the present embodiments in more detail.

The graphics processing pipeline 5 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipelines 5 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 5 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 5.

The rasterisation stage 25 of the graphics processing pipeline 5 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 5 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 5 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 5. This may include the creation of one or more intermediate representations of the program within the compiler.

The compiler may, e.g., run on the host processor 1 of the data processing system that includes the graphics processor 3. (The compiler may, e.g., be part of the driver 4, with there being a special API call to cause the compiler to run. The compiler execution can thus be part of the draw call preparation done by the driver in response to API calls generated by an application).

However, other arrangements would be possible, such as the compiler running on the same processor as the compiled code, or the compiler being run on a separate processor, such as the program being pre-compiled on a separate system and being distributed in a compiled form.

FIG. 2 shows schematically the operation stages of the graphics processing unit 3.

FIG. 3 shows functional units of the graphics processing unit 3 that are used to perform (and thus to act as) various ones of the processing operations and stages of the graphics processing pipeline 5 shown in FIG. 2. (There may be other functional units in the graphics processing unit 3.)

As shown in FIG. 3, the graphics processing unit 3 includes a rasteriser 40, a thread spawner 41, a programmable execution unit 42, a varying interpolator 43, a texture mapper 44, a blender 45, and a set of registers 46.

The thread spawner 41 is operable to spawn execution threads for execution by the programmable execution unit 42, e.g. for fragments that it receives from the rasteriser 40.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to respective registers 46.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

As discussed above, the programmable execution unit 42 executes shader programs to be executed for execution threads that it receives from the thread spawner 41 to perform graphics processing operations.

Figure 4:
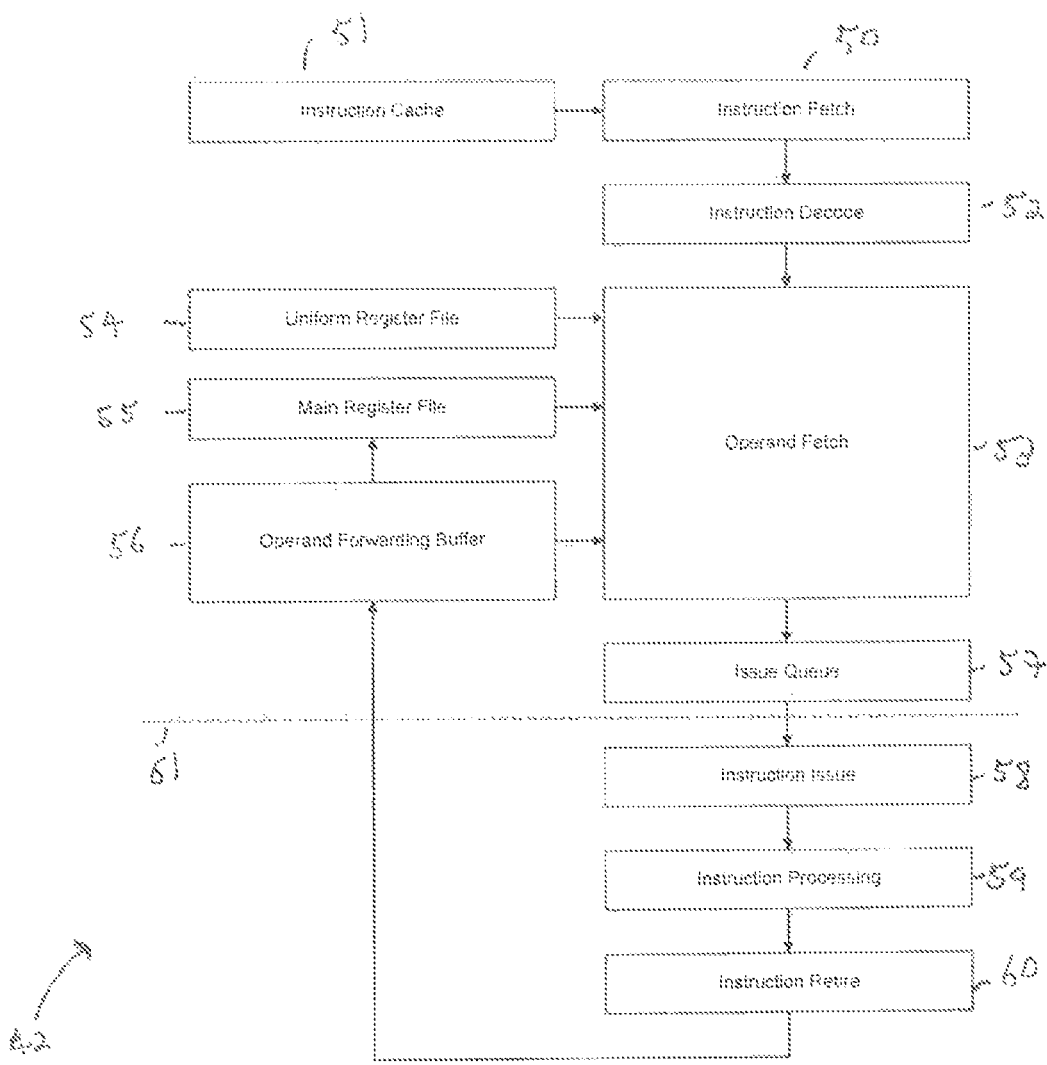
FIG. 4 shows an exemplary programmable execution unit of the graphics processing unit shown in FIG. 3.

FIG. 4 shows an exemplary architecture for the programmable execution unit 42 in more detail.

As shown in FIG. 4, the programmable execution unit 42 includes a number of processing stages and circuitry.

In particular, the programmable execution unit includes instruction fetch circuitry 50 operable to fetch instructions for execution from an instruction cache 51, followed by instruction decode circuitry 52 that maps (decodes) the fetched instruction into a form suitable for the execution pipeline (circuitry) in question.

This is then followed by operand fetch circuitry 53 that fetches and assembles the input operands (input values) required for execution of an instruction.

As shown in FIG. 4, in this case, the operand fetch circuitry 53 is operable to fetch operands for instructions from, inter alia, a "uniform" register file 54 that stores uniform operand values, the general read/write "main" register file 55 for the graphics processor, and an "operand forwarding" buffer 56.

The operand forwarding buffer 56 is a buffer which acts as a fast access and low power storage for operands without the need for main register file access (as shown in FIG. 4). Thus operands may be retained in the operand forward operating buffer 56 and fetched from there directly by the operand fetch circuitry 53. Correspondingly, operand values in the operand forwarding buffer 56 may be written to the main register file 55, as required.

As shown in FIG. 4 decoded instructions for which the operands have been fetched are placed in an issue queue 57 which buffers assembled instructions and operands while waiting for a free execution pipeline to run them in. The instructions are then issued from the issue queue 57 by instruction issue circuitry 58 to instruction execution circuitry 59 (appropriate functional units) for processing (to perform the actual operation that is required for the instruction).

There is then an appropriate instruction retire stage (circuitry) 60 that writes the result of the instruction execution back, in this case to the operand forwarding buffer 56, so that the result value is available for subsequent instructions.

As can be seen from FIG. 4, in the present embodiments, the programmable execution unit 42 is effectively divided into a "front-end" that builds things to execute, and a "back-end" that then executes them (as shown by the dividing line 61, which indicates an asynchronous split in the overall execution pipeline). This then facilitates, for example, building an excess of instructions in the issue queue 57, to ensure forward pressure on the back-end processing pipelines that perform the actual instruction processing.

This can be achieved, e.g., by running multiple copies of the front-end in parallel, and issuing to a single set of back-end processing pipelines, for example. There could also be multiple back-end pipelines running in parallel for different types of operation (e.g. a floating point FMA pipeline, an issue pipeline, and a special functions pipeline, etc.).

Other arrangements would be possible, if desired.

In the present embodiments, and in accordance with the technology described herein, the shader program instruction issue and execution by the programmable execution unit 42 illustrated in FIG. 4 is modified to allow certain instructions that are included in a shader program to be replaced with (to be substituted with) alternative instructions for execution instead of the original instruction.

In particular, and as discussed above, the Applicants have recognised that for certain input operand values, particular types of instruction (instructions performing particular mathematical operations) may instead be replaced by other instructions performing different operations that will still provide the same output result, but in a more efficient manner. The present embodiments exploit this, by determining for instructions included in a shader program whether they can be replaced with an alternative instruction, based on the type of instruction and whether the input operands for the instruction have a particular data value or not.

In the present embodiments, the following instruction replacement (substitution) operations are supported:

00 UNCONDITIONAL (simply execute the original instruction—no replacement is considered)

01 If U==0.0 then MOV 0.0 Elif U==1.0 then MOV src Else EXEC

10 If U==0.0 then MOV src Else EXEC

11 If U==0.0 then MOV-src Else EXEC where:

00 01 10 and 11 identify the operation;

"U" means the, e.g., and in an embodiment, uniform, input operand whose data value is being considered;

"src" means the other, e.g. non-uniform, input operand;

"EXEC" means retain the instruction as normal (do not replace it); and

MOV means replace the instruction with a MOV instruction that copies the indicated data value or input operand to the output.

In the present embodiments, the following instruction types use the above instruction replacement operations as follows:

MUL (multiplication) instructions support optimization type 01

FMA (fused-multiply-add) instructions support optimization type 10 (MOV copies accumulator src) (in this replacement, the uniform input operand U must be one of the multiplier operands)

ADD (addition) instructions support optimization type 10 (MOV copies src)

SUB (subtraction) src—U instructions support optimization type 10 (MOV copies src)

SUB (subtraction) U—src instructions support optimization type 11 (MOV copies-src)

In the present embodiments, the determination of whether an instruction substitution (replacement) can take place or not is done before the operand fetch stage of the programmable execution unit 42 illustrated in FIG. 4.

Figure 5:
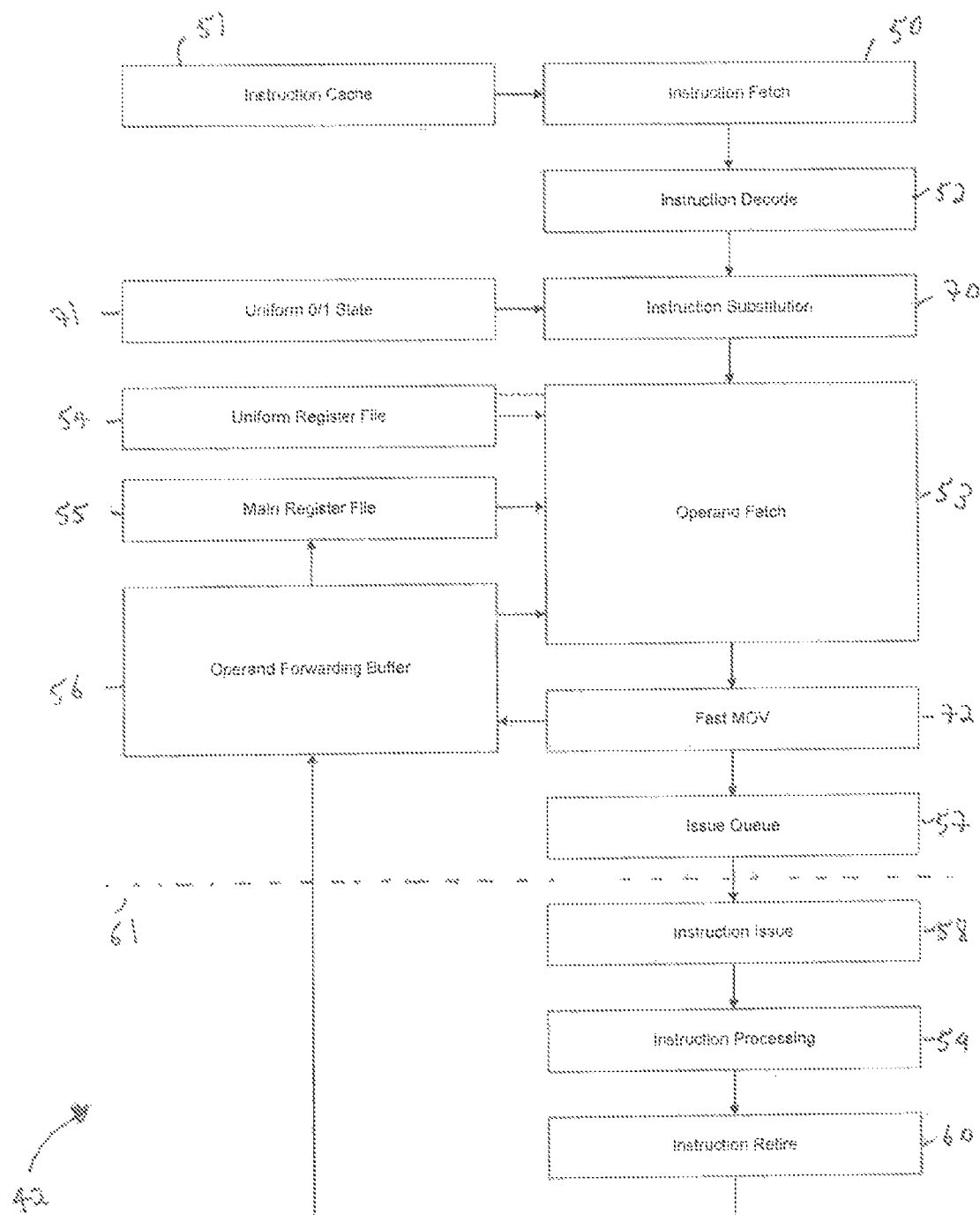
FIG. 5 shows a programmable execution unit of a graphics processor that is in accordance with a first embodiment of the technology described herein.

In a first embodiment, illustrated in FIG. 5, the instruction substitution (replacement) operation 70 is performed on the decoded instructions, before fetching the operands for the instructions. This then facilitates, for example, only fetching the operands for the alternative instruction, where an instruction substitution is performed.

The instruction substitution stage 70 can be implemented using any suitable and desired instruction substitution determining circuitry and will operate to perform instruction substitutions (replacements) based on the instruction type and input operand values as discussed above.

As shown in FIG. 5, in this embodiment the instruction substitution determining circuitry (stage) 70 uses as an input, state information from a state table 71 that is indicative of whether the uniform variables that will be used for the shader program have the value 0 or 1 or not. This state information is then used to determine whether the relevant input operand for an instruction has the particular data value to allow it to be substituted with an alternative instruction or not.

The state table entries for the uniform variables that are included in the uniform state table 71 can be determined in any appropriate and suitable manner.

In one embodiment, this determination is performed, and the state table 71 is prepared, as the uniform values are loaded into the uniform register file 54 for the shader program execution. In this case therefore, the graphics processor will operate to preload uniform values prior to the shader program being executed, and as part of that process determine and store "is 0" and "is 1" states for each uniform input value.

Figure 6:
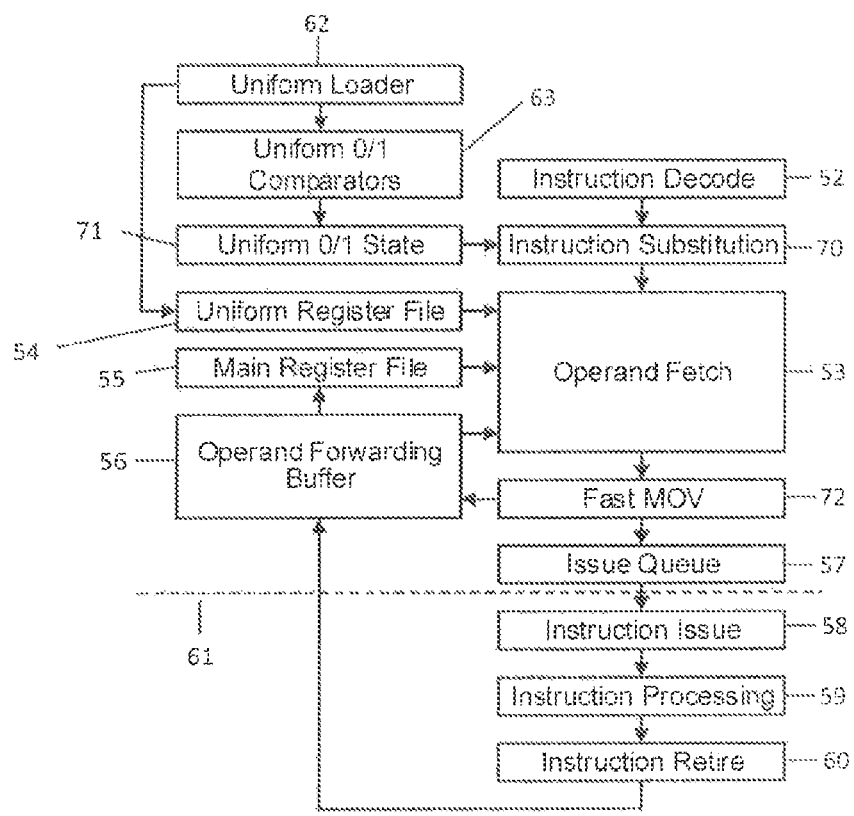
FIG. 6 shows one embodiment of determining state information for uniform variables.

FIG. 6 illustrates this, and show the loading of uniform values into the uniform register file 54 by a uniform loader 62, and the uniform loader 62 at the same time providing the uniforms to a set of uniform "is 0" and "is 1" comparators 63 that determine whether each uniform value has the value 0 or the value 1, and set the "is 0" or "is 1" state in the uniform state table 71 for the uniforms accordingly.

In this case therefore, the uniform comparators 63 will determine the state information for the uniforms "on the fly", as the uniform values are loaded from memory and written into the uniform register file 54.

Figure 7:
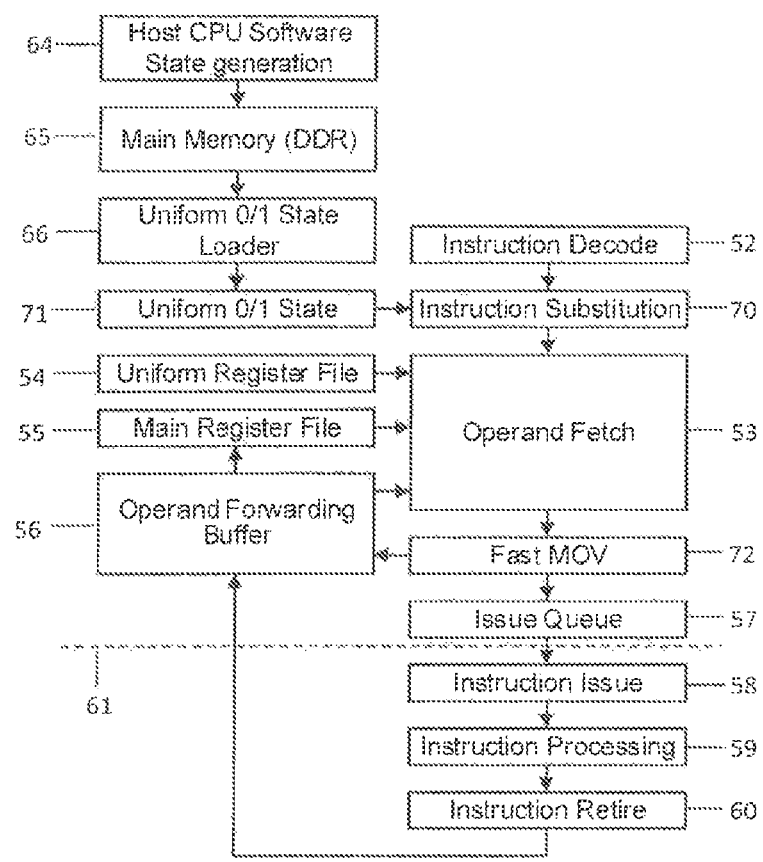
FIG. 7 shows another embodiment of determining state information for uniform variables.

FIG. 7 shows an alternative embodiment in which the "is 0" and "is 1" state information (bits) for each uniform is determined in advance on the CPU (host processor (e.g., and in an embodiment, by the driver 64)), which uniform value state information is then stored in the main memory 65 and loaded therefrom by a uniform "is 0" and "is 1" state information loader 66 to the uniform state table 71. In this case, the uniform value state information will be determined in advance and loaded without additional processing.

Other arrangements would, of course, be possible.

It would also be possible to generalise this to non-uniform variables by including comparators operable to determine the "is 0" and "is 1" state for any variable value written into the operand buffer (registers), if desired.

Figure 8:
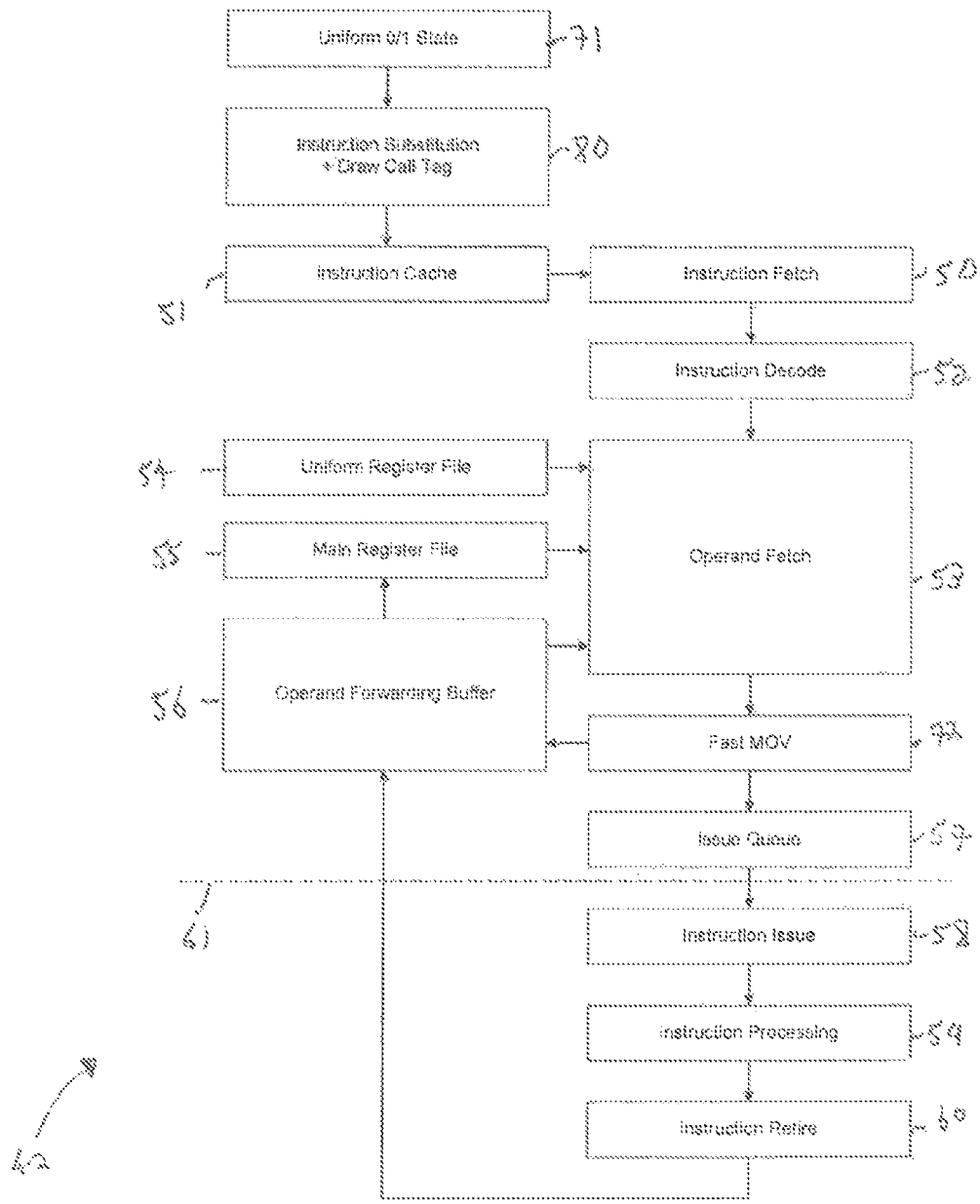
FIG. 8 shows a programmable execution unit of a graphics processor that is in accordance with a second embodiment of the technology described herein.

FIG. 8 shows a second embodiment for the programmable execution unit 42, in which the instruction substitution determination and operation is performed as the instructions are loaded into the instruction cache 51. Thus in this case, the instruction substitution operation 80 takes place as the instructions are loaded into the instruction cache 51, as shown in FIG. 8 (and again uses the "is 0" or "is 1" uniform state table 71 as an input).

This arrangement has the advantage that any instruction substitution is only done once (since the alternative instruction will then be present in the instruction cache), rather than having to do an instruction substitution each time the instruction in question is present in a shader program. (Although on the other hand, it may be necessary to duplicate cache lines containing substitutions, e.g. per draw call, as the uniform state will be unique to each draw call, which can then reduce cache efficiency.)

FIGS. 5 and 8 also show the inclusion of a "fast move" operation stage (circuitry) 72 prior to the inclusion of an instruction in the issue queue 57. This stage is operable to implement a move instruction that is to be placed in the issue queue by means of moving the appropriate data value within the operand forwarding buffer 56 instead. This will then mean that the move operation to be performed by the move instruction is performed by shuffling the data values within the operand forwarding buffer 56, without the need to execute the move instruction on the instruction execution (processing) pipeline 59 itself. This will then avoid having to execute the move instruction and will also mean that the move instruction does not need adding to the issue queue nor issuing for execution.

This further enhances the efficiency gains of the technology described herein, as move operations can then be performed in such a manner that they are effectively "free" from the point of view of thread throughput, and will not consume capacity in the main execution processing pipeline.

Figure 9:
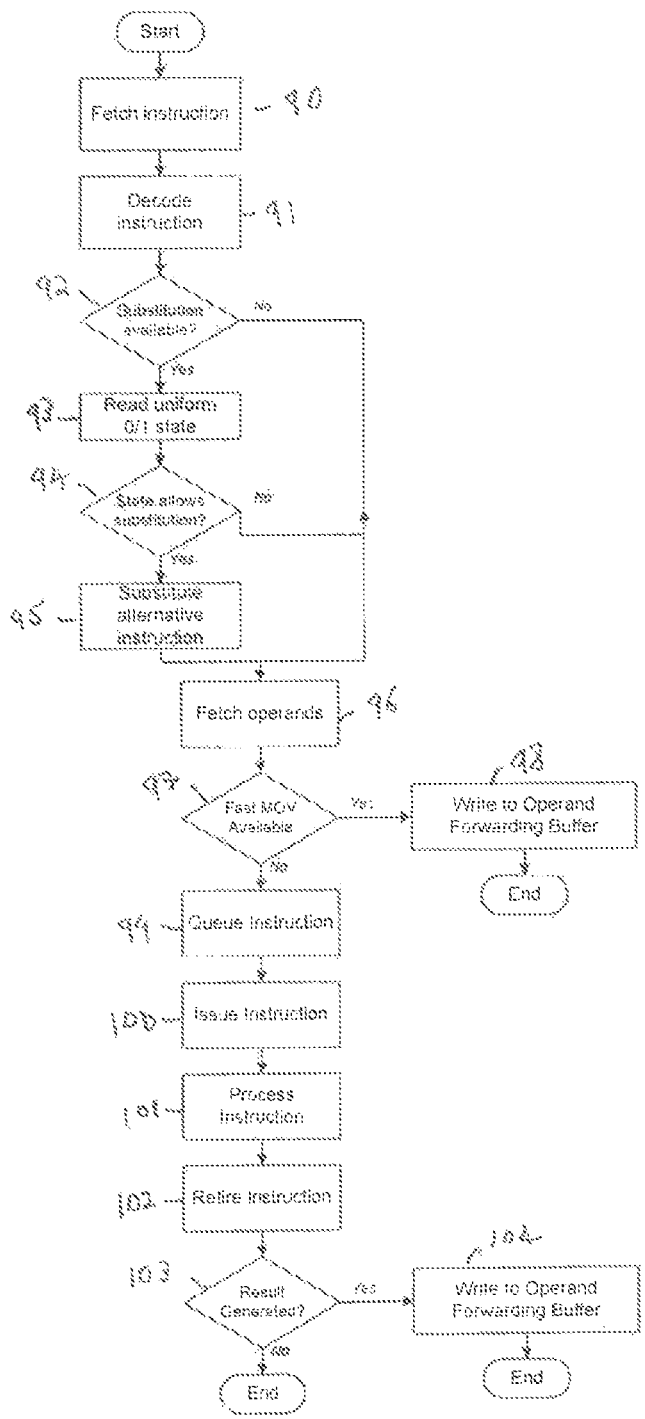
FIG. 9 shows schematically the execution of an instruction in an embodiment of the technology described herein.

FIG. 9 is a flowchart illustrating the operation of the programmable execution unit 42 shown in FIG. 5 when executing a shader program.

FIG. 9 shows the flow of execution for a single instruction. Each instruction in the shader program will be processed in this manner.

As shown in FIG. 9 (and in FIG. 5), the process starts with fetching an instruction in the instruction cache (step 90). The instruction is then decoded (step 91). It is then determined based on the type of instruction, whether a potential instruction substitution (replacement) can be performed for the instruction (step 92). (If not, as shown in FIG. 9, the process then moves to fetch the operands for the instruction in the normal manner (step 96).)

When it is determined that the instruction is a potential substitution (replacement) target, the data state (i.e. whether it is 1 or 0) for the input operand that is a uniform variable is checked (step 93), and it is then determined whether the input operand value according to the state information indicates that the instruction should be substituted (replaced) or not (step 94).

If it is determined that the instruction should be replaced (substituted), then the instruction is replaced with the indicated alternative instruction (step 95).

The operands for the substituted alternative instruction (or for the original instruction in the case where it was determined that substitution was not possible) are then fetched (step 96).

It is then determined whether a "fast move" operation (as discussed above) is possible for the instruction (step 97). (As shown in FIG. 9, the fast move operation could be used for both a substitute move operation and for a non-substituted move instruction, so this step is outside the conditional path for instruction substitution (replacement).)

If it is determined that the fast move operation can be performed for the instruction, then that operation is performed by moving the input operand value to the required place in the operand forwarding buffer (step 98). The process then ends.

On the other hand, when the instruction (whether the alternative instruction or the original instruction) cannot be implemented using the fast move operation, then the instruction is added to the instruction queue in the normal manner (step 99), from where it is issued to the instruction execution circuitry (step 100) and then executed (step 101), and retired (step 102).

When the instruction is retired, it is determined whether the instruction has generated a result (step 103), and, if so, the result is then appropriately written to the operand forwarding buffer (step 104) for future use (e.g. either as an input operand for a subsequent instruction and/or for writing to the main register file (and, potentially, for output then to the memory system as an output value)).

Figure 10:
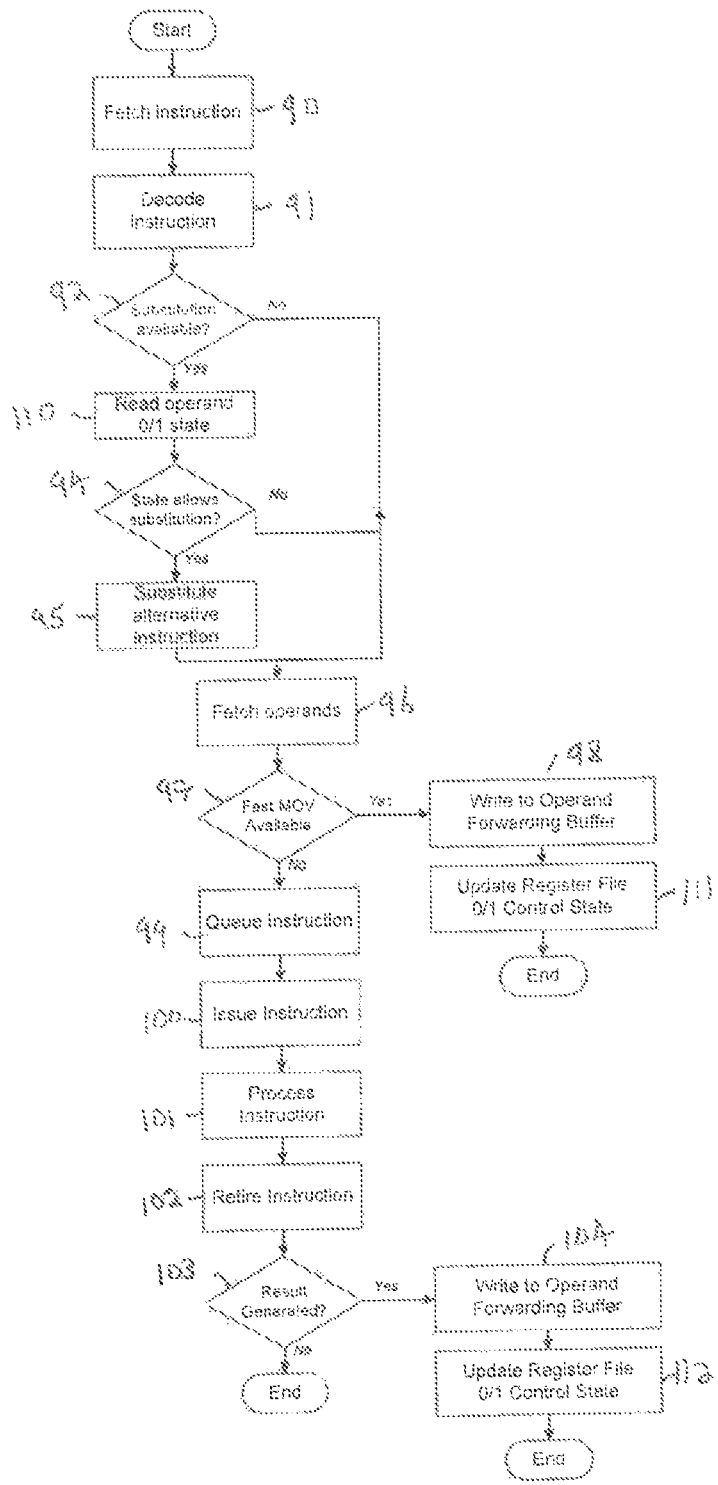
FIG. 10 shows schematically the execution of an instruction in another embodiment of the technology described herein.

FIG. 10 is a flowchart that is similar to FIG. 9, but which illustrates an embodiment in which rather than simply considering whether a uniform input operand permits the substitution of an instruction with an alternative instruction, the state of operands that are other than uniforms may also be considered and used to trigger the substitution of alternative instructions, if desired.

In this case therefore, as shown in FIG. 10, the instruction substitution operation considers whether an input operand has the "is 0" or "is 1" state (step 110), which input operand need not be a uniform variable.

In this case, as shown in FIG. 10, the operand forwarding buffer write back paths also include an additional step of updating the operand "is 0" or "is 1" control state for the written back operand value accordingly (step 111 and step 112). This is because the instruction execution may result in the operand value, and thus its "is 0" or "is 1" state, changing, and so that needs to be updated in the operand "is 0" and "is 1" state table.

Figure 11:
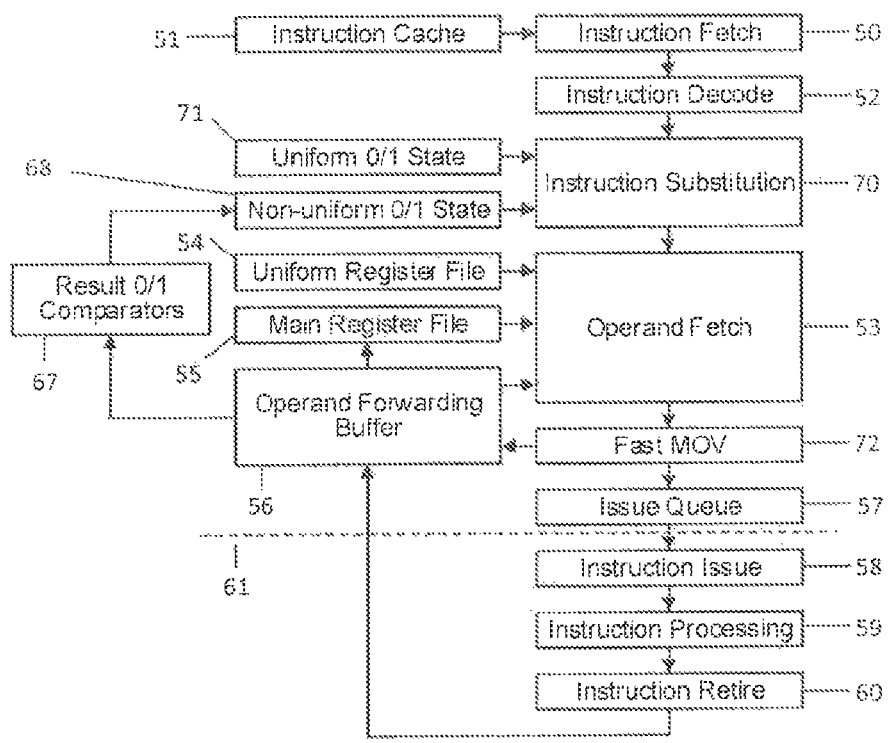
FIG. 11 shows an embodiment of determining state information for instruction results that will be used as input operands.

FIG. 11 shows this operation, and in particular the use of result "is 0" and "is 1" state comparators 67 to determine the "is 0" or "is 1" state of results (computation outputs) generated by instructions that are written to the operand forwarding buffer 56. The appropriate "is 0" and "is 1" state information is then provided/updated in a "non-uniform" operand state table 68 for use when determining whether to substitute instructions or not.

The technology described herein can be implemented for any desired and suitable shader program that may include, for example, instructions whose operation may, in effect, be "disabled" by setting input data values for the operations to particular values.

An example shader program to which the present embodiments can be applied is as follows:

```
#version 100
precision mediump float;
uniform vec4 uTint;
varying vec4 vColor;
void main ( ) {
    gl_FragColor = vColor * uTint;
}
```

This example fragment shader program loads a gradient from a varying value and then applies a uniform based colour tint (uTint) to all four colour channels. This could be used, e.g., to show more red when a player is injured.

In normal execution of this shader program, in all cases where the colour is untinted (all the tint weights are 1.0), the shader would execute four fp16 interpolations and four fp16 multiplications.

On the other hand, when executed using the present embodiments, when the tint weights were 1.0, the present embodiments would operate to replace (substitute) the multiplication operations with corresponding move operations, such that execution of the shader program would then require four fp16 interpolations and four fp16 move operations. This would therefore provide an energy saving compared to the shader operation without the instruction substitution in the manner of the present embodiments.

It can be seen from the above that the technology described herein, in its embodiments at least, can provide more energy efficient execution of shader programs in graphics processing systems. This is achieved, in the embodiments of the technology described herein at least, by identifying opportunities to replace instructions in a shader program with alternative, more energy efficient, instructions, based on the type of instructions and the values of input operands for the instructions.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor that executes a graphics processing pipeline which includes a programmable shading stage that executes compiled graphics shader programs to perform graphics shading operations, wherein the compiled graphics shader programs are graphics shader programs which have been compiled by a compiler, the method comprising:
    the graphics processor, when executing a compiled shader program to perform graphics shading operations:
    for an instruction to be executed for the compiled shader program:
    determining, based on the nature of the instruction and the value of an input operand to be processed by the instruction, whether to replace the instruction with an alternative instruction, wherein the determining based on the value of an input operand to be processed by the instruction comprises either determining whether the input operand has a data value of 0 or determining whether the input operand has a data value of 1; and
    based on the determination, either:
    retaining the instruction and continuing execution of the compiled shader program with the retained instruction;
    or
    replacing the instruction with an alternative instruction and continuing execution of the compiled shader program with the alternative instruction in place of the instruction.

2. The method of claim 1, wherein the determination of whether to replace an instruction with an alternative instruction based on the nature of the instruction and the value of an input operand for the instruction comprises:
    first determining based on the nature of the instruction whether the instruction is an instruction for which a replacement instruction is possible, followed by, when so, determining based on the value of an input operand for the instruction, whether replacement with the alternative instruction should be performed or not.

3. The method of claim 1, wherein:
    determining, based on the nature of the instruction and the value of an input operand to be processed by the instruction, whether to replace the instruction with an alternative instruction comprises:
    determining whether the instruction in the shader program comprises an instruction of a particular type, and when it is determined that the instruction in the shader program is not of the particular instruction type, retaining the instruction and continuing execution of the shader program with the retained instruction.

4. The method of claim 3, wherein the particular instruction type comprises one or more of: a multiplication instruction, a fused multiply-add instruction, an addition instruction, and a subtraction instruction.

5. The method of claim 1, wherein:
    determining, based on the nature of the instruction and the value of an input operand to be processed by the instruction, whether to replace the instruction with an alternative instruction comprises:
    when it is determined that the input operand for the instruction in the shader program does not have the particular data value, retaining the instruction and continuing execution of the shader program with the retained instruction.

6. The method of claim 1, wherein the input operand whose value is considered to determine whether to replace the instruction or not is an input operand that is a uniform variable of the shader program.

7. The method of claim 1, wherein the determination of whether to replace the instruction based on the value of the input operand is done using state information that indicates whether the input operand value has a particular value to trigger the instruction replacement or not.

8. The method of claim 1, wherein the alternative instruction that the instruction in the shader program is replaced with when it is determined based on the nature of the instruction and the value of an input operand that the instruction in the shader program should be replaced with an alternative instruction comprises an instruction that performs a move operation to place a data value in an output variable for the instruction that is being replaced.

9. The method of claim 8, wherein the data value that is placed in the output variable comprises one of: a predetermined data value and a data value of one of the input operands of the instruction that is being replaced.

10. The method of claim 1, wherein the determination of whether to replace an instruction with an alternative instruction and the replacement of an instruction with an alternative instruction is performed either after the instruction has been decoded, or when the instruction is being loaded into an instruction cache.

11. The method of claim 1, wherein:
continuing execution of the shader program with the alternative instruction in place of the instruction comprises issuing the alternative instruction for execution and executing the alternative instruction as part of the shader program execution.

12. The method of claim 1, wherein:
the graphics processor includes a buffer that acts as a storage for operands for instructions and from which operands may be fetched without needing main register file access; and
continuing execution of the shader program with the alternative instruction in place of the instruction comprises moving a data value within the operand buffer in response to the alternative instruction.

13. A graphics processor that executes a graphics processing pipeline which includes a programmable shading stage that executes compiled graphics shader programs to perform graphics shading operations, wherein the compiled graphics shader programs are graphics shader programs which have been compiled by a compiler the graphics processor comprising:
programmable processing circuitry operable to execute compiled graphics shader programs to perform graphics shading operations;
and further comprising:
instruction replacement circuitry operable to, when the programmable processing circuitry is executing a compiled shader program to perform graphics shading operations:
for an instruction to be executed for the shader program:
determine, based on the nature of the instruction and the value of an input operand to be processed by the instruction, whether to replace the instruction with an alternative instruction, wherein the determining based on the value of an input operand to be processed by the instruction comprises either determining whether the input operand has a data value of 0 or determining whether the input operand has a data value of 1; and
based on the determination, either:
retain the instruction in the compiled shader program and cause the programmable processing circuitry to continue execution of the compiled shader program with the retained instruction;
or
replace the instruction with an alternative instruction in the compiled shader program and cause the programmable processing circuitry to continue execution of the compiled shader program with the alternative instruction in place of the instruction.

14. The graphics processor of claim 13, wherein the instruction replacement circuitry is configured to:
first determine based on the nature of the instruction whether the instruction is an instruction for which a replacement instruction is possible, and to, when so, then determine based on the value of an input operand for the instruction, whether replacement with the alternative instruction should be performed or not.

15. The graphics processor of claim 13, wherein:
the instruction replacement circuitry is configured to:
determine whether the instruction in the shader program comprises an instruction of a particular type, and to, when it is determined that the instruction in the shader program is not of the particular instruction type, retain the instruction and continuing execution of the shader program with the retained instruction.

16. The graphics processor of claim 15, wherein the particular instruction type comprises one or more of: a multiplication instruction, a fused multiply-add instruction, an addition instruction, and a subtraction instruction.

17. The graphics processor of claim 13, wherein:
the instruction replacement circuitry is configured to:
when it is determined that an input operand for the instruction in the shader program does not have the particular data value, retain the instruction and continuing execution of the shader program with the retained instruction.

18. The graphics processor of claim 13, wherein the input operand whose value is considered to determine whether to replace the instruction or not is an input operand that is a uniform variable of the shader program.

19. The graphics processor of claim 13, wherein the instruction replacement circuitry is configured to:
determine whether to replace the instruction based on the value of the input operand using state information that indicates whether the input operand value has a particular value to trigger the instruction replacement or not.

20. The graphics processor of claim 13, wherein the alternative instruction that the instruction in the shader program is replaced with when it is determined based on the nature of the instruction and the value of an input operand that the instruction in the shader program should be replaced with an alternative instruction comprises an instruction that performs a move operation to place a data value in an output variable for the instruction that is being replaced.

21. The graphics processor of claim 20, wherein the data value that is placed in the output variable comprises one of: a predetermined data value and a data value of one of the input operands of the instruction that is being replaced.

22. The graphics processor of claim 20, wherein:
the graphics processor includes a buffer that acts as a storage for operands for instructions and from which operands may be fetched without needing main register file access; and
the programmable processing circuitry is configured to move a data value within the operand buffer in response to the alternative instruction that performs a move operation to place a data value in an output variable for the instruction that is being replaced.

23. The graphics processor of claim 13, wherein the determination of whether to replace an instruction with an alternative instruction and the replacement of an instruction with an alternative instruction is performed either after the instruction has been decoded, or when the instruction is being loaded into an instruction cache.

24. A non-transitory computer readable storage medium storing computer software code which when executing on a processor performs a method of operating a graphics processor that executes a graphics processing pipeline which includes a programmable shading stage that executes compiled graphics shader programs to perform graphics shading operations, wherein the compiled graphics shader programs are graphics shader programs which have been compiled by a compiler, the method comprising:

the graphics processor, when executing a compiled shader program to perform graphics shading operations:

for an instruction to be executed for the compiled shader program:

determining, based on the nature of the instruction and the value of an input operand to be processed by the instruction, whether to replace the instruction with an alternative instruction, wherein the determining based on the value of an input operand to be processed by the instruction comprises either determining whether the input operand has a data value of 0 or determining whether the input operand has a data value of 1; and based on the determination, either:

retaining the instruction and continuing execution of the compiled shader program with the retained instruction; or replacing the instruction with an alternative instruction and continuing execution of the compiled shader program with the alternative instruction in place of the instruction.

* * * * *